United States Patent
Knauf

(10) Patent No.: US 11,208,914 B2
(45) Date of Patent: Dec. 28, 2021

(54) FLAP ARRANGEMENT FOR A TURBINE OF A TURBOCHARGER

(71) Applicant: BorgWarner Inc., Auburn Hills, MI (US)

(72) Inventor: Josef Knauf, Freinsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 39 days.

(21) Appl. No.: 16/753,009

(22) PCT Filed: Oct. 11, 2018

(86) PCT No.: PCT/US2018/055431
§ 371 (c)(1),
(2) Date: Apr. 2, 2020

(87) PCT Pub. No.: WO2019/075210
PCT Pub. Date: Apr. 18, 2019

(65) Prior Publication Data
US 2020/0240282 A1 Jul. 30, 2020

(30) Foreign Application Priority Data
Oct. 11, 2017 (DE) .......................... 102017218166.4

(51) Int. Cl.
*F02B 37/18* (2006.01)
*F01D 17/14* (2006.01)
*F16K 1/20* (2006.01)

(52) U.S. Cl.
CPC .......... *F01D 17/145* (2013.01); *F02B 37/186* (2013.01); *F16K 1/20* (2013.01); *F02B 37/183* (2013.01)

(58) Field of Classification Search
CPC ........ F01D 17/145; F01F 1/20; F02B 37/183; F02B 37/186; F16K 1/20; F01K 7/16
(Continued)

(56) References Cited

U.S. PATENT DOCUMENTS 3,494,589 A 2/1970 Mumma
4,251,053 A * 2/1981 Wurzer ..................... F16K 7/16
251/331

(Continued)

FOREIGN PATENT DOCUMENTS

DE    16 75 549 A1    1/1971
DE    20 2014 007538 U1    10/2014

OTHER PUBLICATIONS

International Search Report of the International Searching Authority for PCT/US2018/055431 dated Jan. 18, 2019.

*Primary Examiner* — Thai Ba Trieu

(74) *Attorney, Agent, or Firm* — Howard & Howard Attorneys PLLC

(57) ABSTRACT

The invention relates to a flap arrangement for a turbine of a turbocharger, in particular for a wastegate valve of the turbine, having a spindle for mounting the flap arrangement in a rotatable manner in a turbine housing, having a lever arm, wherein the lever arm is coupled to the spindle, and having a flap disk, wherein the flap disk is coupled to the lever arm. At least part of the lever arm is configured elastically such that applying a closing force to the flap arrangement, when the flap disk is in contact with a flap seat in the turbine housing, provides for relative movement of the flap disk in relation to the spindle, in order to compensate for thermal deformation of the turbine housing and/or wear.

16 Claims, 3 Drawing Sheets

(58) Field of Classification Search
USPC .......................................................... 60/602
See application file for complete search history.

(56) References Cited

U.S. PATENT DOCUMENTS

| | | | | |
|---|---|---|---|---|
| 9,885,278 | B2* | 2/2018 | Dilalan | F02B 37/183 |
| 10,487,724 | B2* | 11/2019 | Stilgenbauer | F02B 37/183 |
| 10,646,970 | B2* | 5/2020 | Ruh | F02B 37/183 |
| 2012/0055154 | A1 | 3/2012 | Ebert | |
| 2018/0094573 | A1* | 4/2018 | Schoenherr | F02B 37/186 |
| 2020/0025061 | A1* | 1/2020 | Hoehn | F02B 37/186 |
| 2020/0173349 | A1* | 6/2020 | Golz | F02B 37/183 |

* cited by examiner

FLAP ARRANGEMENT FOR A TURBINE OF A TURBOCHARGER

CROSS-REFERENCE TO RELATED APPLICATIONS

The present application is the National Stage of International Patent Application No. PCT/US2018/055431 filed on Oct. 11, 2018, which claims priority to and all the benefits of German Patent Application No. 102017218166.4 filed on Oct. 11, 2017, which are hereby expressly incorporated herein by reference in their entirety.

FIELD OF THE INVENTION

The present invention relates to a flap arrangement for a turbine of a turbocharger and to a turbine and to a turbocharger having a corresponding flap arrangement.

BACKGROUND OF THE INVENTION

Known turbochargers have a turbine with a turbine wheel which is driven by the exhaust-gas flow of the internal combustion engine. A compressor wheel, which is arranged along with the turbine wheel on a joint shaft, compresses the fresh air which is taken in for the engine, as a result of which the pressure of the fresh air increases. This means that the quantity of air or oxygen which is available to the engine for combustion purposes increases, and this in turn leads to an increase in performance of the internal combustion engine. The pressure which is to be generated is always dependent here, on account of the turbine wheel being coupled to the compressor wheel, on the quantity of exhaust gas delivered. In certain operating states, it is necessary to reduce and/or to regulate the amount of drive energy acting on the compressor.

For this purpose, use is made, inter alia, of wastegate valves, which can release and close a bypass channel or wastegate channel. Exhaust gases can be directed through the wastegate valve and the bypass, and thus around the turbine, and it is therefore no longer the case that the entire quantity of exhaust gas acts on the turbine wheel. These wastegate valves are usually designed in the form of flap valves, which are actuated via an actuator. Known flap arrangements have a flap disk fixed to a lever arm, wherein the lever arm is coupled to a spindle, which is mounted in a rotatable manner in the turbine housing. The hot exhaust-gas flow heats up the turbine to a pronounced extent, and therefore the turbine housing reaches high temperatures. The high temperatures lead to thermal expansion in the turbine housing. However, since the same temperatures do not prevail at all locations, and the wall thicknesses in corresponding regions of the turbine housing can differ, the thermal expansion is not the same at all locations. This can result in thermal deformation of the flap seat for the flap arrangement in the turbine housing relative to the bore in which the flap arrangement is mounted. The thermal deformation is problematic since, in the case of such rigid flap arrangements, it leads to leakage, since the rigid flap disk is no longer resting in a flat state on the flap seat. Increased leakage, in turn, leads to losses in performance. Even excessive actuating force on the part of the actuator can only partially compensate for the problems arising from the thermal deformation.

Accordingly, the aim of the present invention is to provide a flap arrangement which is intended for a turbine of a turbocharger and is capable of compensating for the thermal deformation.

SUMMARY OF THE INVENTION

The present invention relates to a flap arrangement for a turbine, to a turbine and to a turbocharger.

The flap arrangement according to the invention for a turbine of a turbocharger, in particular for a wastegate valve of the turbine, comprises a spindle for mounting the flap arrangement in a rotatable manner in a turbine housing, also comprises a lever arm, wherein the lever arm is coupled to the spindle, and further comprises a flap disk, wherein the flap disk is coupled to the lever arm. At least part of the lever arm is configured elastically such that applying a closing force to the flap arrangement, when the flap disk is in contact with a flap seat in the turbine housing, provides for relative movement of the flap disk in relation to the spindle, in order to compensate for thermal deformation of the turbine housing and/or wear. The closing force may be associated with, or may be, the torque due to rotation of the spindle. The configuration of the lever arm according to the invention means that, in the case of the flap arrangement being subjected to appropriate force in the closed state, the lever arm is elastically deformed, for example bent, to a slight extent on account of its at least partially elastic configuration, and this compensates for the differences in the thermal deformation of the flap seat in relation to the mounting of the spindle in the turbine housing (for example in the form of a bushing bore), the deformation occurring during operation of a turbocharger. Even during use and in the case of correspondingly high temperatures in the region of the wastegate and the resulting thermal deformation, this leads to an improved fit for the flap disk on the flap seat and, consequently, to better sealing of the wastegate channel. The same applies to the compensation for (irregular) wear, which can lead to leakage. The better sealing is equivalent to a lower level of leakage, which in turn provides for a reduction in the closing force which has to be applied to the flap arrangement. Moreover, the configuration of the flap arrangement according to the invention also avoids the risk of the flap arrangement jamming.

In some configurations, it is possible for only a sub-region of the lever arm to be configured elastically. The elastic sub-region can have a reduced cross-sectional surface area in comparison with the rest of the lever arm.

In some configurations, it is possible for the remaining sub-region of the lever arm to be configured to be stiff relative to the sub-region that is configured elastically. In some configurations, the sub-region of the lever arm that is configured elastically has cross-sections that vary. In some configurations, the sub-region of the lever arm that is configured to be stiff has cross-sections that vary. In some configurations, the sub-region of the lever arm that is configured elastically has different lengths. In some configurations, the sub-region of the lever arm that is configured to be stiff has variable angles, when the angle is measured between a horizontal axis and the longitudinal axis of the stiff sub-region. In some preferable configurations, the sub-region of the lever arm that is configured elastically has a fixed length. In some preferable configurations, the sub-region of the lever arm that is configured to be stiff has a fixed angle, when the angle is measured between a horizontal axis and the longitudinal axis of the stiff sub-region. In some preferable configurations, the sub-region of the lever arm that is configured to be stiff does not have a varying cross-section.

In configurations which can be combined with all the configurations described to this point, the lever arm can be configured, and arranged in relation to the spindle and the flap disk, such that the elastic sub-region is subjected essentially to pressure loading by the closing force when there is no thermal deformation of the turbine housing occurring. Such an arrangement and configuration of the elastic sub-region has the advantage that the desired effect of the elastic sub-region, namely the compensation for thermal deformation or wear, actually occurs only when thermal deformation occurs and/or for other reasons, for example wear, the flap disk no longer rests in a fully flat state on the flap seat. When there is no thermal deformation occurring and/or the flap disk rests in a fully flat state on the flap seat, then the elastic sub-region is subjected exclusively to pressure loading, and therefore there is pretty much no relative movement between the flap disk and the spindle. If, on account of thermal deformation or for other reasons, the flap disk no longer rests in a fully flat state on the flap seat (leakage occurs), a moment is introduced into the elastic sub-region when the closing force is applied to the flap arrangement in the closed position of the flap arrangement. On account of the at least partial elasticity of the lever arm, the moment leads to the flap disk moving relative to the spindle, as a result of which the flap disk ends up resting once again in a fully flat state on the flap seat.

In configurations which can be combined with all the configurations described to this point, the lever arm can have at least a first lever-arm portion and a second lever-arm portion, wherein one end of the second lever-arm portion is coupled to the flap disk. The elastic sub-region can be arranged in the region of the second lever-arm portion. As an alternative, the elastic sub-region can also be provided in the first lever-arm portion. It is also possible for two elastic sub-regions to be provided, one in the first lever-arm portion and one in the second lever-arm portion.

In an alternative configuration, a predominant part of the lever arm, in particular the entire lever arm, can be designed elastically in order to compensate for the thermal deformation.

In configurations which can be combined with all the configurations described to this point, the elastic parts of the lever arm can have a lower level of bending strength than the rest of the lever arm and/or than the spindle.

In configurations which can be combined with all the configurations described to this point, the spindle and the lever arm can be formed in one piece.

In configurations which can be combined with all the configurations described to this point, the flap disk can be fixed to the lever arm. In particular, the lever arm can be welded to the flap disk.

In configurations which can be combined with all the configurations described to this point, on its upper side, the flap disk can have a spherical recess, in which a spherical end of the lever arm is arranged.

The invention also comprises a turbine for a turbocharger, having a turbine housing, and having a wastegate valve, which is suitable for directing exhaust gas past a wheel of the turbine. The wastegate valve comprises a flap arrangement according to any one of the configurations described above.

In some configurations of the turbine, the turbine housing can have a bushing bore, in which a bushing is arranged, wherein the spindle of the flap arrangement can be mounted in a rotatable manner in the bushing.

The invention also comprises a turbocharger having a turbine according to any one of the configurations described above.

Further details and features of the invention will be described hereinbelow with reference to the figures.

DETAILED DESCRIPTION

Exemplary embodiments for the flap arrangement 10 according to the invention and for a turbine having such a flap arrangement 10 and for a corresponding turbocharger will be described hereinbelow with reference to the figures.

Figure 1:
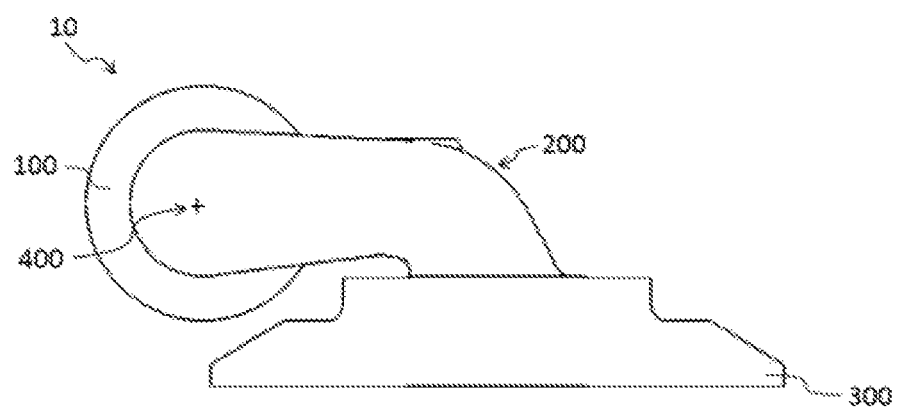
FIG. 1 shows a side view of a flap arrangement known from the prior art.

FIG. 1 shows a prior-art flap arrangement 10 for a turbine of a turbocharger. The flap arrangement 10 has a spindle 100, a lever arm 200 and a flap disk 300. When used in a turbocharger, the flap arrangement 10 is mounted in the turbine housing such that it can be rotated about the axis of rotation 400 via the spindle 100, and therefore the flap arrangement 10 can specifically close or release a through-passage opening, for example a wastegate.

Figure 2:
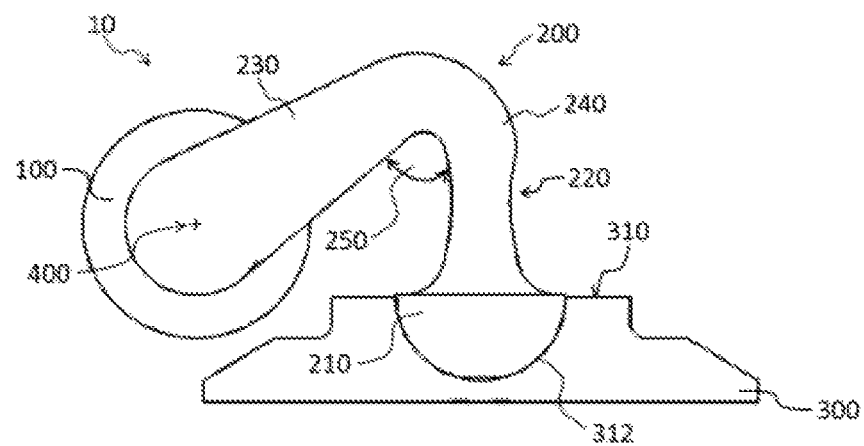
FIG. 2 shows a sectional view of a first exemplary embodiment of a flap arrangement according to the invention.
Figure 3:
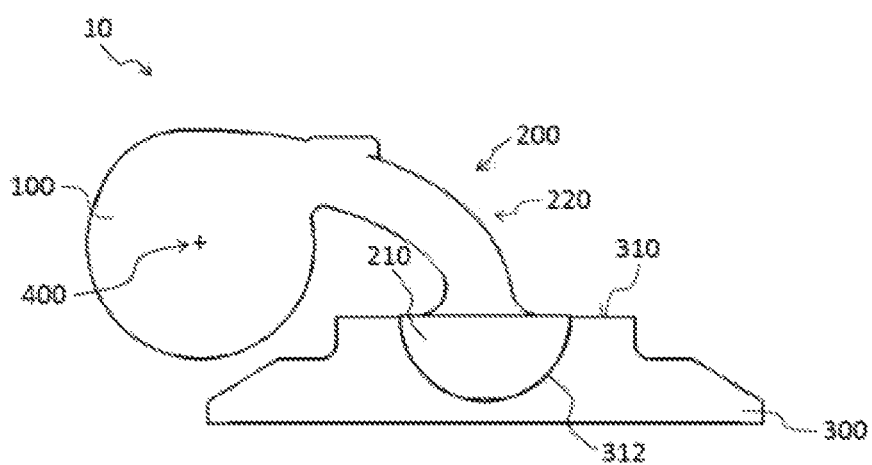
FIG. 3 shows a sectional view of a second exemplary embodiment of a flap arrangement according to the invention.
Figure 4:
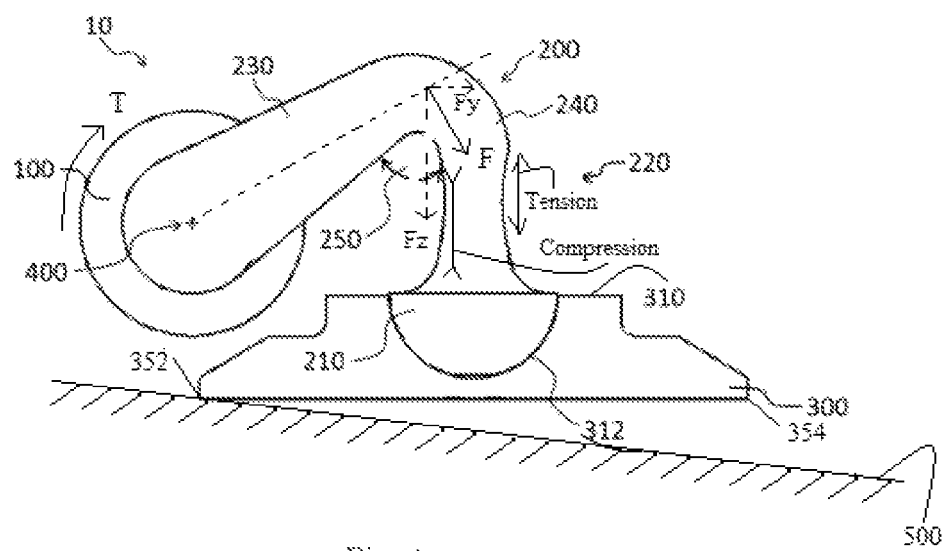
FIG. 4 shows a sectional view of an exemplary scenario involving an embodiment of a flap arrangement according to the invention.

FIG. 2 and FIG. 3 show exemplary embodiments according to the invention of the flap arrangements 10 for a turbine of a turbocharger, in particular for a wastegate valve of the turbine. FIG. 4 shows an exemplary scenario according to the invention of the flap arrangements 10. It is likewise the case that the flap arrangements according to the invention comprise a spindle 100 for mounting the flap arrangement 10 in a rotatable manner in a turbine housing, also comprise a lever arm 200 and further comprise a flap disk 300. The lever arm 200 is coupled to the spindle 100 and the flap disk 300. The spindle 100 is coupled to the lever arm 200 at a first end of the lever arm 200. The flap disk 300 is coupled to the lever arm 200 at a second end of the lever arm 200. In the case of the flap arrangement 10 according to the invention, at least part of the lever arm 200 is configured elastically. The elasticity of the (part of the) lever arm 200 here is such that applying a closing force to the flap arrangement 10 in the installed state, and when the flap disk 300 is in contact with a flap seat in the turbine housing, provides for relative movement of the flap disk 300 in relation to the spindle 100. This relative movement can compensate for thermal deformation of the turbine housing and/or wear.

The configuration of the lever arm 200 according to the invention means that, in the case of the flap arrangement 10 being subjected to appropriate force in the closed state, the lever arm 200 is elastically deformed, for example bent, to a slight extent on account of its at least partially elastic configuration. This makes it possible to compensate for the differences in the thermal deformation of the flap seat in relation to the mounting of the spindle 100 in the turbine housing (for example in the form of a bushing bore), the deformation occurring during operation of a turbocharger. Even during use and in the case of correspondingly high temperatures in the region of the wastegate and the resulting thermal deformation, this leads to an improved fit of the flap disk 300 on the flap seat and, consequently, to better sealing of the wastegate channel. The same applies to the compensation for (irregular) wear, which can lead to leakage. The better sealing is equivalent to a lower level of leakage, which in turn provides for a reduction in the closing force which has to be applied to the flap arrangement 10. In the case of large turbochargers and correspondingly large flap disks 300, the flap disk 300 extends to (more or less) beneath the axis of rotation 400 of the spindle 100. This can increase the likelihood of jamming. The configuration of the flap arrangement according to the invention can avoid the risk of the flap arrangement 10 jamming.

In the exemplary embodiment of FIG. 2, only a sub-region 220 of the lever arm 200 is configured elastically. In this example, the elastic sub-region 220 has a reduced cross-sectional surface area in comparison with the rest of the lever arm 200. If the lever arm 200 has a circular cross section, then the elastic sub-region can have, for example, a smaller diameter than the rest of the lever arm. The diameter preferably tapers or widens continuously, that is to say seamlessly, in the peripheral parts of the elastic sub-region, no steps therefore being formed (see FIG. 2).

As likewise illustrated in FIG. 2, the lever arm 200 can be configured, and arranged in relation to the spindle 100 and the flap disk 300, such that the elastic sub-region 220 is subjected essentially to pressure loading by the closing force, in particular when there is no thermal deformation of the turbine housing occurring, the deformation leading to skewing of the flap disk 300 on the flap seat. In the non-limiting exemplary embodiment of FIG. 2, the sub-region 220 has variable cross-sections as shown. Such an arrangement and configuration of the elastic sub-region 220 has the advantage that the desired effect of the elastic sub-region 220, namely the compensation for thermal deformation or wear, actually occurs only when thermal deformation occurs and/or for other reasons, for example wear, the flap disk 300 no longer rests in a fully flat state on the flap seat. When there is no thermal deformation occurring and/or the flap disk 300 rests in a fully flat state on the flap seat, then the elastic sub-region 220 is subjected exclusively to pressure loading, and therefore there is pretty much no relative movement between the flap disk 300 and the spindle 100. If, on account of thermal deformation or for other reasons, the flap disk 300 no longer rests in a fully flat state on the flap seat (leakage occurs), a moment is introduced into the elastic sub-region 220 when the closing force is applied to the flap arrangement 10 in the closed position of the flap arrangement 10. On account of the at least partial elasticity of the lever arm 200, the moment leads to the flap disk 300 moving relative to the spindle 100, as a result of which the flap disk 300 ends up resting once again in a fully flat state on the flap seat. In this case, the remaining regions of the lever arm remain rigid, and therefore no undesired deformation of the lever arm 200, and therefore the flap arrangement 10, occurs in these regions.

As can be seen in the example of FIG. 2, the lever arm 200 can have at least a first lever-arm portion 230 and a second lever-arm portion 240, wherein one end 210 of the second lever-arm portion 240 is coupled to the flap disk 300. The first lever-arm portion 210 and the second lever-arm portion 240 can enclose, for example, an angle 250 between 20° and 80°, in particular between 30° and 70°, preferably between 40° and 60°. In the exemplary embodiment shown in FIG. 2, the second lever-arm portion 240 extends essentially orthogonally from the upper side 310 of the flap disk 300. The elastic sub-region 220 is arranged in the region of the second lever-arm portion 240. As an alternative, the elastic sub-region 220 can also be provided in the first lever-arm portion 230. Depending on the configuration, it is also possible for two elastic sub-regions 220 to be provided, one in the first lever-arm portion 230 and one in the second lever-arm portion 240. It is also possible for a plurality of elastic sub-regions 220 to be provided in the first lever-arm portion 230 and/or in the second lever-arm portion 240. Depending on the configuration, it is also possible for a sub-region that is configured to be stiff (not shown) relative to the elastic sub-region 220 to be arranged in the region of the first lever-arm portion 230 when the elastic sub-region 220 is arranged in the region of the second lever-arm portion 240.

In the alternative configuration of FIG. 3, a predominant part of the lever arm 200 is designed elastically in order to compensate for the thermal deformation. It is also possible, in particular, for the entire lever arm 200 to be configured in this way. This can be made possible, for example, by the entire lever arm 200 having a smaller cross-sectional surface area than the spindle 100 and/or than known lever arms (see FIG. 1). If, then, a closing force acts on the flap arrangement 10, the smaller cross-sectional surface area (and therefore a reduced level of bending strength) causes the lever arm 200 to behave elastically, this making it possible to compensate for thermal deformation of the turbine housing and/or wear.

In particular, in the case of all the exemplary embodiments, the sub-region or sub-regions 220 of the lever arm 200 have/has a lower level of bending strength than the rest of the lever arm 200 and/or than the spindle 100.

In an exemplary scenario of FIG. 4, like numerals represent like parts as described with respect to FIG. 2. The flap disk 300 has an end 354 on one side of the disk 300 and another end 352 on an opposite side of the disk 300. End 352 is shown to be in contact with flap seat 500. FIG. 4 shows an example of how when thermal deformation, wear or other reasons have occurred, this results in the flap disk 300 not resting in a fully flat state on the flap seat 500 such that end 354 is not in contact with the flap seat 500. FIG. 4 is an exemplary depiction of how forces and stresses acting on the elastic sub-region 220 affect displacement of the flap disk 300 so that the flap disk 300 rests in a fully flat state on the flap seat 500.

To enable the flap disk 300 to rest in a fully flat state on the flap seat 500 and to enable both ends 352 and 354 to contact the flap seat 500, a closing force F resulting from a torque T due to the rotation of spindle 100 is applied to the lever arm 200 having elastic sub-region 220 as shown in FIG. 4. Force F has vector components $F_z$ and $F_y$. As the force F is applied to the elastic sub-region 220, a tension stress and a compression stress act on the elastic sub-region 220. A tension stress acts on the region of the elastic sub-region 220 that is closer to end 354, that is, the end of the flap disk 300 that is not in direct contact with the flap seat 500, as shown in FIG. 4. A compression stress acts on the opposite region of the elastic sub-region 220 that is closer to end 352, that is, the end of the flap disk 300 that is in direct contact with the flap seat 500, as shown in FIG. 4.

It is to be appreciated that if, instead as shown in FIG. 4, end 354 is in contact with flap seat 500 and end 352 is not in contact with flap seat 500, then the tension stress would act on the region of the elastic sub-region 220 that is closer to end 352 as the end of the flap disk 300 that is not in direct contact with the flap seat 500 and the compression stress would act on the region of the elastic sub-region 220 that is closer to end 354 as the end of the flap disk 300 that is in direct contact with the flap seat 500.

It is to be appreciated that the regions of the elastic sub-region 220 on which the compression stress acts and the regions of the elastic sub-region 220 on which the tension stress acts may be integral with one another, i.e., the entire sub-region 220 is one piece.

As the force F is applied and the tension and compression stresses act on elastic sub-region 220, the flap disk 300 is able to rest in a fully flat state on the flap seat 500 and both ends 352 and 354 contact the flap seat 500.

For the configurations of FIG. 2 and of FIG. and of FIG. 4, provision may be made for the spindle 100 and the lever arm 200 to be formed in one piece. Moreover, the flap disk 300 is fixed to the lever arm 200. In particular, the connection between the lever arm 200 and the flap disk 300 can be established by welding. This means that the lever arm 200 and the flap disk 300 are connected rigidly to one another. In other words, there is pretty much no possibility of relative movement between the lever arm 200 and the flap disk 300. In this region, it is therefore not possible to compensate for different levels of thermal deformation of the flap seat in the turbine housing relative to the bushing bore in the turbine housing, the bushing bore serving to accommodate the spindle 100 or a bushing in which the spindle 100 is mounted. Since it is preferably the case that the spindle 100 and the lever arm 200 are formed in one piece, there is also no provision made for relative movement between the lever arm 200 and the spindle 100 in the transition region between the spindle 100 and lever arm 200.

In order for the flap disk 300 to be connected to the lever arm 200, it is possible, on its upper side 310, for the flap disk 300, as shown in FIG. 2 and FIG. 3, to have a spherical recess 312, in which a spherical end 210 of the lever arm 200 is arranged. Such a configuration facilitates the assembly of the flap arrangement 10 and the aligned coupling of the lever arm 200 and flap disk 300 by means of welding.

Preferably, a wastegate arm, such as the lever arm 200, has dimensions and material properties to effect a displacement of all or a portion of a wastegate valve, such as the portion of a wastegate valve that is the flap disk 300, when a stress level is applied to the wastegate arm. The displacement may be in the y direction or vertical direction. The stress level values may be maximum values. The stress level values may be absolute values. The stress level values may be values regardless of whether an individual stress level value is based on a compression stress value or a tension stress value.

In at least one embodiment, the wastegate arm has dimensions and material properties such that a displacement of at least 0.72 mm of the wastegate valve is achieved. In at least one embodiment, the wastegate arm has dimensions and material properties such that a displacement of between 0.24 mm and 0.40 mm of the wastegate valve is achieved when a stress level of between 125 MPa and 350 MPa is applied to the wastegate arm. As described, the stress level may be a compression stress level or a tension stress level.

In at least one embodiment, the wastegate arm has dimensions and material properties such that a displacement of between 0.32 and 0.36 mm is achieved when a stress level of between 150 and 200 MPa is applied to the wastegate arm. In at least one other embodiment, the wastegate arm has dimensions and material properties such that a displacement of between 0.32 and 0.34 mm is achieved when a stress level of between 200 and 250 MPa is applied to the wastegate arm. In at least one other embodiment, the wastegate arm has dimensions and material properties such that a displacement of between 0.32 and 0.34 mm is achieved when a stress level of between 300 and 350 MPa is applied to the wastegate arm. In at least one other embodiment, the wastegate arm has dimensions and material properties such that a displacement of between 0.28 and 0.32 mm is achieved when a stress level of between 300 and 350 MPa is applied to the wastegate arm.

In at least one other embodiment, the wastegate arm has dimensions and material properties such that a displacement of between 0.38 and 0.40 mm is achieved when a stress level of between 250 and 300 MPa is applied to the wastegate arm. In at least one other embodiment, the wastegate arm has dimensions and material properties such that a displacement of between 0.26 and 0.28 mm is achieved when a stress level of between 125 and 175 MPa is applied to the wastegate arm.

As described, any particular stress level may be a compression stress level or a tension stress level.

The closing force may be applied to a flap arrangement, which includes an at least partially elastically configured lever arm and a flap disk coupled to the lever arm, to create a displacement of the flap disk (typically measured in mm) in the y direction (or vertical direction) to effect the result that the flap disk rests in a fully flat state on the flap seat. Preferably, the closing force is applied to the flap arrangement linearly to create the displacement. In other words, the stress level values described above may be data points on the linear portion (i.e. elastic region) of a stress-strain curve for the material of the at least partially elastically configured lever arm.

The invention also comprises a turbine for a turbocharger, having a turbine housing and having a wastegate valve, which is suitable for directing exhaust gas past a wheel of the turbine. The wastegate valve comprises a flap arrangement 10 according to any one of the exemplary embodiments described above. The turbine housing can have, for example, a bushing bore, in which a bushing is arranged, wherein the spindle 100 of the flap arrangement 10 is mounted in a rotatable manner in the bushing.

The invention also comprises a turbocharger having a turbine described above.

The invention claimed is:

1. A flap arrangement (10) for a turbine of a turbocharger comprising:
    a spindle (100) for mounting the flap arrangement (10) in a rotatable manner in a turbine housing;
    a lever arm (200), wherein the lever arm (200) is coupled to the spindle (100); and
    a flap disk (300), wherein the flap disk (300) is coupled to the lever arm (200);
    wherein at least part of the lever arm (200) is configured elastically such that applying a closing force to the flap arrangement (10), when the flap disk (300) is in contact with a flap seat in the turbine housing, provides for relative movement of the flap disk (300) in relation to the spindle (100), in order to compensate for thermal deformation of the turbine housing and/or wear, and
    wherein the lever arm (200) has dimensions and material properties such that a displacement of between 0.24 mm and 0.40 mm of the flap disk (300) is achieved when a stress level of between 125 MPa and 350 MPa is applied to the lever arm (200).

2. The flap arrangement as claimed in claim 1, wherein only a sub-region (220) of the lever arm (200) is configured elastically.

3. The flap arrangement as claimed in claim 2, wherein the elastic sub-region (220) has a reduced cross-sectional surface area in comparison with the rest of the lever arm (200).

4. The flap arrangement as claimed in claim 2, wherein the lever arm (200) is configured, and arranged in relation to the spindle (100) and the flap disk (300), such that the elastic sub-region (220) is subjected to pressure loading by the closing force when there is no thermal deformation of the turbine housing occurring.

5. The flap arrangement as claimed in claim 2, wherein the lever arm (200) has at least a first lever-arm portion (230) and a second lever-arm portion (240), wherein one end (210) of the second lever-arm portion (240) is coupled to the flap disk (300).

6. The flap arrangement as claimed in claim 5, wherein the elastic sub-region (220) is arranged in a region of the second lever-arm portion (240).

7. The flap arrangement as claimed in claim 2, wherein the elastic sub-regions (220) of the lever arm (200) have a lower level of bending strength than the rest of the lever arm (200) and/or than the spindle (100).

8. The flap arrangement as claimed in claim 1, wherein a predominant part of the lever arm (200) is designed elastically in order to compensate for the thermal deformation.

9. The flap arrangement as claimed in claim 1, wherein the spindle (100) and the lever arm (200) are formed in one piece.

10. The flap arrangement as claimed in claim 1, wherein the flap disk (300) is fixed to the lever arm (200).

11. The flap arrangement as claimed in claim 1, wherein, on an upper side (310), the flap disk (300) has a spherical recess (312), in which a spherical end (210) of the lever arm (200) is arranged.

12. The flap arrangement as claimed in claim 1, wherein the lever arm (200) has the dimensions and the material properties such that the displacement selected from one of conditions is achieved: a displacement of between 0.32 and 0.36 mm of the flap disk (300) when a stress level of between 150 and 200 MPa is applied to the lever arm (200); a displacement of between 0.32 and 0.34 mm of the flap disk (300) when a stress level of between 200 and 250 MPa is applied to the lever arm (200); a displacement of between 0.32 and 0.34 mm of the flap disk (300) when a stress level of between 300 and 350 MPa is applied to the lever arm (200); a displacement of between 0.28 and 0.32 mm of the flap disk (300) when a stress level of between 300 and 350 MPa is applied to the lever arm (200); a displacement of between 0.38 and 0.40 mm of the flap disk (300) when a stress level of between 250 and 300 MPa is applied to the lever arm (200); and a displacement of between 0.26 and 0.28 mm of the flap disk (300) when a stress level of between 125 and 175 MPa is applied to the lever arm (200).

13. The flap arrangement as claimed in claim 1, wherein the entire lever arm (200) is designed elastically in order to compensate for the thermal deformation.

14. A turbine for a turbocharger,
comprising: a turbine housing; and
a wastegate valve, which is suitable for directing exhaust gas from an engine passing a wheel of the turbine;
wherein the wastegate valve further comprises a flap arrangement (10) mounted on a spindle (100) in a rotatable manner in a turbine housing;
a lever arm (200), wherein the lever arm (200) is coupled to the spindle (100); and
a flap disk (300), wherein the flap disk (300) is coupled to the lever arm (200);
wherein at least part of the lever arm (200) is configured elastically such that applying a closing force to the flap arrangement (10), when the flap disk (300) is in contact with a flap seat in the turbine housing, provides for relative movement of the flap disk (300) in relation to the spindle (100), in order to compensate for thermal deformation of the turbine housing and/or wear, and
wherein the lever arm (200) has dimensions and material properties such that a displacement of between 0.24 mm and 0.40 mm of the flap disk (300) is achieved when a stress level of between 125 MPa and 350 MPa is applied to the lever arm (200).

15. The turbine as claimed in claim 14, wherein the turbine housing has a bushing bore, in which a bushing is arranged, wherein the spindle (100) of the flap arrangement (10) is mounted in a rotatable manner in the bushing.

16. A turbocharger comprising:
a turbine mounted in a turbine housing; and
a wastegate valve, which is suitable for directing exhaust gas from an engine passing a wheel of the turbine;
wherein the wastegate valve further comprises a flap arrangement (10) mounted on a spindle (100) in a rotatable manner in a turbine housing;
a lever arm (200), wherein the lever arm (200) is coupled to the spindle (100); and
a flap disk (300), wherein the flap disk (300) is coupled to the lever arm (200);
wherein at least part of the lever arm (200) is configured elastically such that applying a closing force to the flap arrangement (10), when the flap disk (300) is in contact with a flap seat in the turbine housing, provides for relative movement of the flap disk (300) in relation to the spindle (100), in order to compensate for thermal deformation of the turbine housing and/or wear, and
wherein the lever arm (200) has dimensions and material properties such that a displacement of between 0.24 mm and 0.40 mm of the flap disk (300) is achieved when a stress level of between 125 MPa and 350 MPa is applied to the lever arm (200).

\* \* \* \* \*